C. A. Ball,
Harness Trimmings,
No. 53,726. Patented Apr. 3, 1866.
Fig;
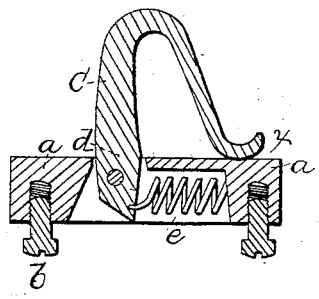
Fig;
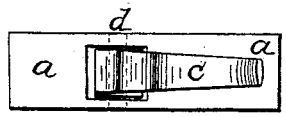
Witnesses;
Isaac Dayton
John Todd
Inventor;
Charles A. Ball

United States Patent Office.

CHARLES A. BALL, OF NEW YORK, N. Y., ASSIGNOR TO HIMSELF AND THOMAS LIVEY, OF SAME PLACE.

IMPROVED CHECK-HOOK.

Specification forming part of Letters Patent No. 53,726, dated April 3, 1866.

*To all whom it may concern:*

Be it known that I, CHARLES A. BALL, of of the city and State of New York, have invented, made, and applied to use a certain new and useful Improvement in Check-Rein Hooks and I do hereby declare the following to be a full, clear, and exact description of the said invention, reference being had to the annexed drawings, making part of this specification, wherein—

Figure 1 is a vertical longitudinal section of said hook, and Fig. 2 is a plan of the same.

Similar letters denote the same parts in both figures.

The check-rein in harness has usually been passed into a volute or scroll hook upon the saddle. Frequently the movement of the horse causes the rein to become unhooked.

The nature of my said invention consists in a spring or yielding check-rein hook that is opened for the reception of the rein by pressing the hook forward, and at other times remaining closed, so that the rein cannot get out or become unhooked. If the horse draws upon the check-rein so as to raise the opening end of the hook, the moment the strain ceases the hook closes and retains the check-rein within the hook instead of allowing it to slip out of the hook, as frequently occurs with the check-rein hooks in common use.

This check-rein hook is a new article of manufacture, possessing peculiar and advantageous features not before found in such articles.

In the drawings, $a$ represents a socket or plate, of any desired shape or ornamental character, and the same is to be attached to the saddle by screws $b$ passing up from below, or in any other desired manner.

$c$ is the check-rein hook, upon a fulcrum-pin, $d$. $e$ is a helical or other spring contained within the socket $a$, and acting to keep the moving end $x$ of the hook $c$ toward the upper surface of said socket or plate $a$. This hook may be made of any desired or ornamental shape or form.

The check-rein is introduced between the end $x$ and plate $a$, when the spring $e$ is compressed by pressing the hook $c$ forward, and thereby raising this end $x$, and the spring $e$ keeps the hook with the end $x$ in contact with $a$, so that the check-rein cannot get out of place. When any strain comes upon the check-rein the hook $c$ yields slightly and comes into contact with the front portion of the mortise (in $a$) which contains said hook, and at this point a stop or projection may be provided upon the socket or plate $a$ to prevent injury to the hook or spring by too great movement, or from a heavy strain.

What I claim, and desire to secure by Letters Patent, is—

The spring check-rein hook attached to the socket or plate $a$ by the fulcrum-pin $d$, and provided with the moving end $x$, that closes against the socket or plate $a$, as and for the purposes specified.

In witness whereof I have hereunto set my signature this 9th day of February, A. D. 1866.

CHARLES A. BALL.

Witnesses:
ISAAC DAYTON,
JOHN TODD.